United States Patent
Wesling et al.

(10) Patent No.: US 9,328,814 B2
(45) Date of Patent: May 3, 2016

(54) CLAD CHAINRING

(71) Applicant: SRAM, LLC, Chicago, IL (US)

(72) Inventors: Kevin Wesling, Lombard, IL (US); Anthony Medaglia, San Luis Obispo, CA (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 14/305,735

(22) Filed: Jun. 16, 2014

(65) Prior Publication Data

US 2015/0362057 A1  Dec. 17, 2015

(51) Int. Cl.
*F16H 55/30* (2006.01)
*F16H 55/06* (2006.01)
*B62M 9/10* (2006.01)

(52) U.S. Cl.
CPC ............. *F16H 55/06* (2013.01); *B62M 9/10* (2013.01); *F16H 55/30* (2013.01)

(58) Field of Classification Search
CPC .. F16H 55/30; F16H 2055/306; B62M 9/105; B62M 9/10; B62D 55/0963
USPC .................................................. 474/152, 161
See application file for complete search history.

(56) References Cited

U.S. PATENT DOCUMENTS

| | | | | |
|---|---|---|---|---|
| 3,730,009 A * | 5/1973 | Mead et al. | | 474/161 |
| 3,990,136 A * | 11/1976 | Hishida | | 29/893.37 |
| 4,174,642 A * | 11/1979 | Martin et al. | | 474/156 |
| 4,348,199 A * | 9/1982 | Oonuma et al. | | 474/156 |
| 4,472,164 A * | 9/1984 | Pusch et al. | | 474/161 |
| 4,589,860 A * | 5/1986 | Brandenstein et al. | | 474/161 |
| 4,867,733 A * | 9/1989 | Yamanoi et al. | | 474/161 |
| 5,098,346 A * | 3/1992 | Redmond | | 474/161 |
| 6,220,970 B1 * | 4/2001 | Berger et al. | | 464/180 |
| 6,468,173 B1 * | 10/2002 | Jeong | | 474/158 |
| 6,540,630 B1 * | 4/2003 | Oertley | | 474/162 |
| 6,666,786 B2 * | 12/2003 | Yahata | | 474/152 |
| 6,899,651 B2 * | 5/2005 | Oertley | | 474/162 |
| 7,491,143 B2 * | 2/2009 | Valle | | 474/160 |
| 7,824,287 B2 * | 11/2010 | Nonoshita et al. | | 474/161 |
| 7,967,709 B2 * | 6/2011 | Emura et al. | | 474/161 |
| 8,365,881 B2 | 2/2013 | Iwai et al. | | |
| 2003/0083166 A1 * | 5/2003 | Oertley | | 474/162 |
| 2005/0282672 A1 * | 12/2005 | Nonoshita | | 474/161 |
| 2006/0073927 A1 * | 4/2006 | Haesloop | | 474/161 |
| 2013/0143704 A1 | 6/2013 | Blank et al. | | |
| 2014/0335983 A1 * | 11/2014 | Iwai et al. | | 474/78 |
| 2014/0335987 A1 * | 11/2014 | Iwai et al. | | 474/161 |
| 2015/0198231 A1 | 7/2015 | Emura | | |

* cited by examiner

*Primary Examiner* — Henry Liu
(74) *Attorney, Agent, or Firm* — Milan Milosevic; Lisa Serdynski

(57) ABSTRACT

A bicycle chainring, including a generally annular body formed of at least an inner material, the inner material including a first side and a second side opposite the first side and a plurality of teeth disposed about a periphery of the body. At least some of the plurality of teeth are formed of both the inner material and an outer material, the outer material disposed on one or both of the first and second sides, the outer material having a greater wear resistance relative to the inner material and a thickness greater than 0.1 millimeter.

36 Claims, 10 Drawing Sheets

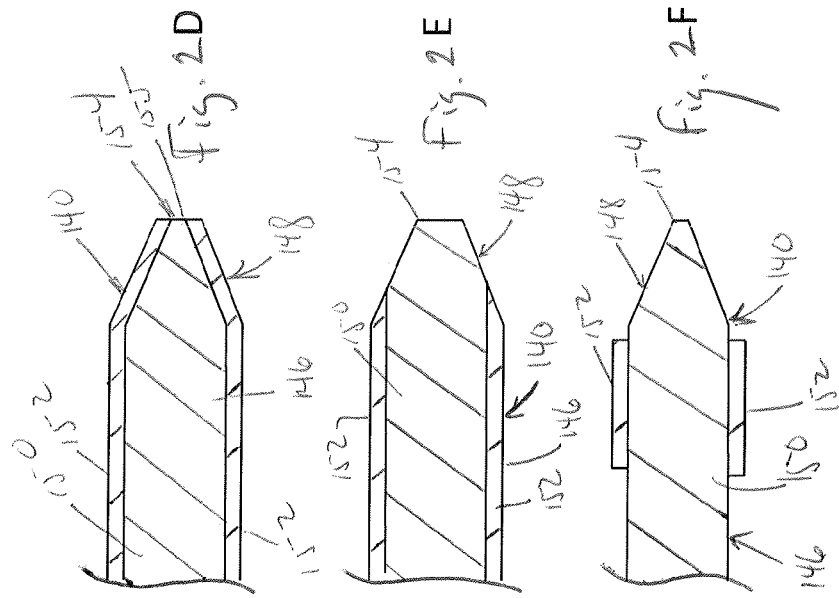
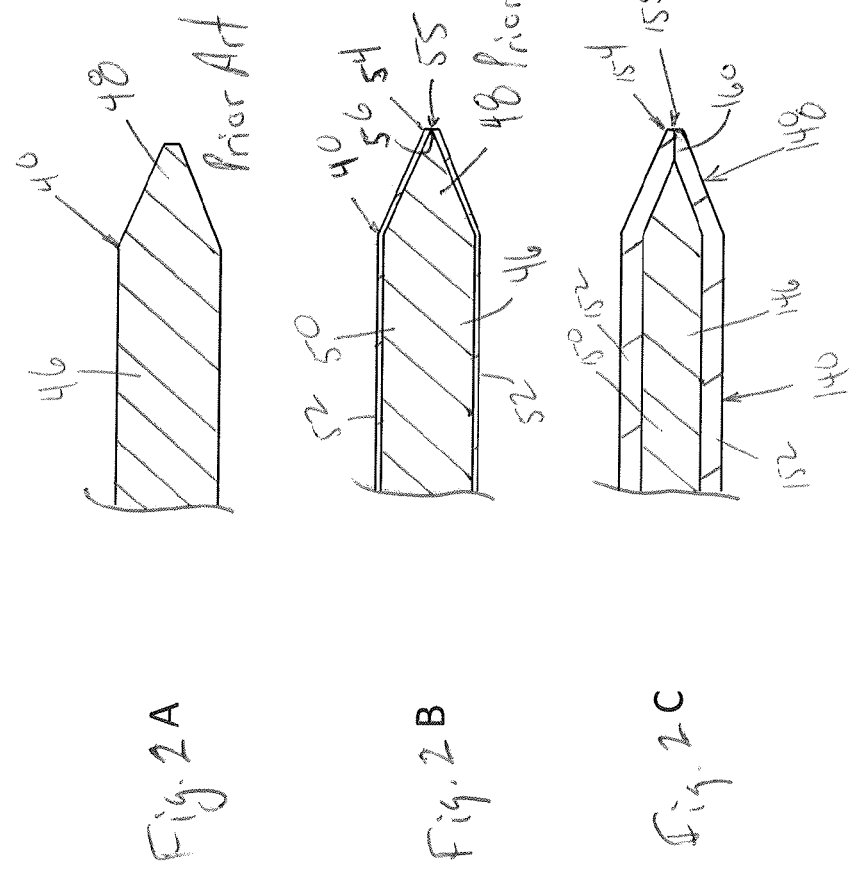

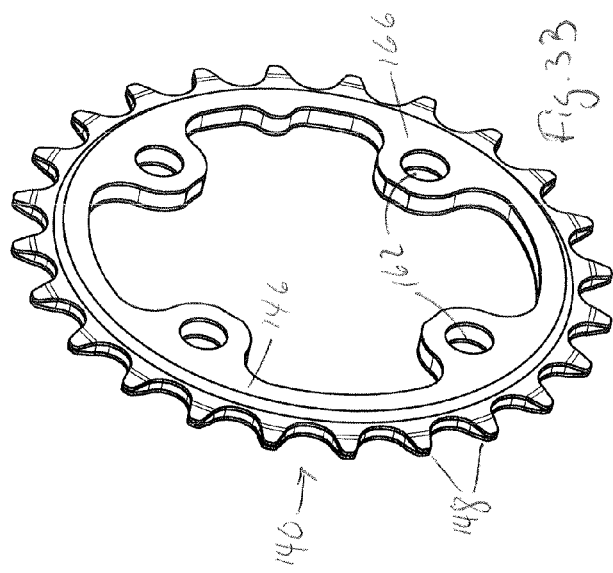
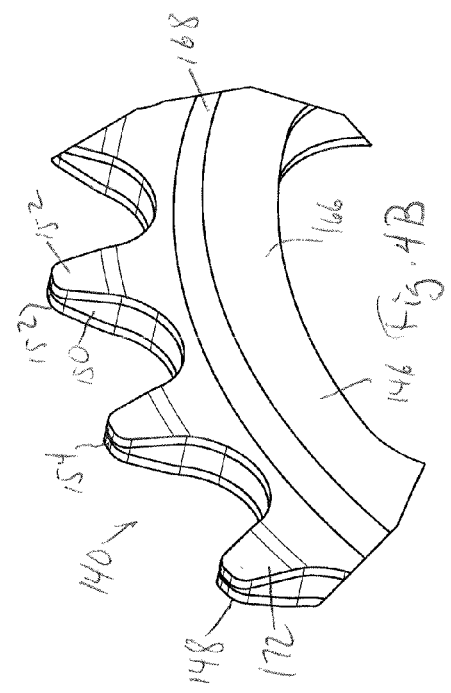
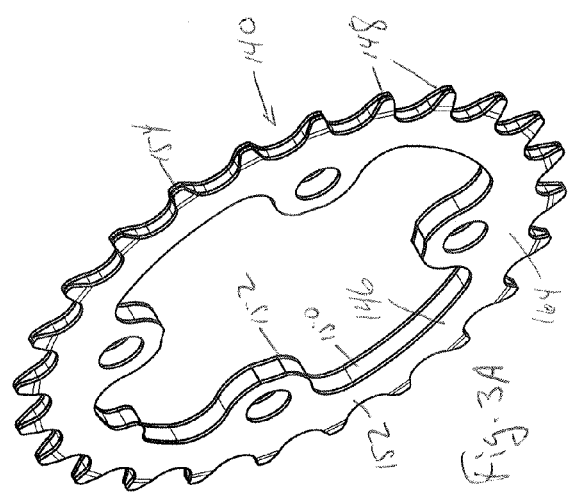
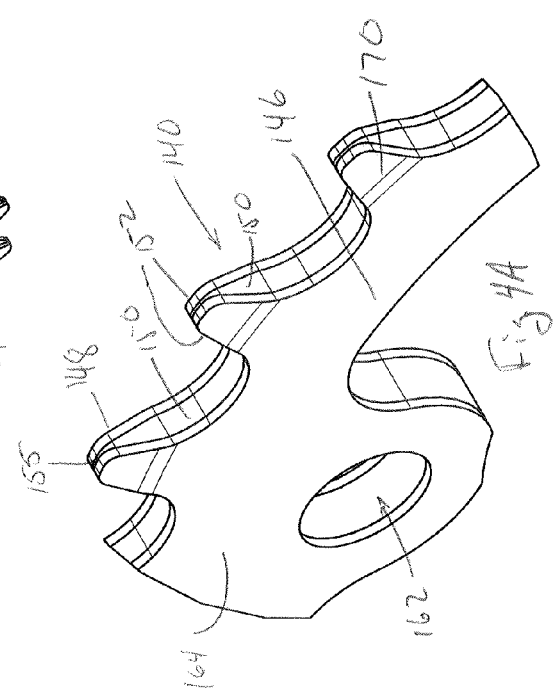

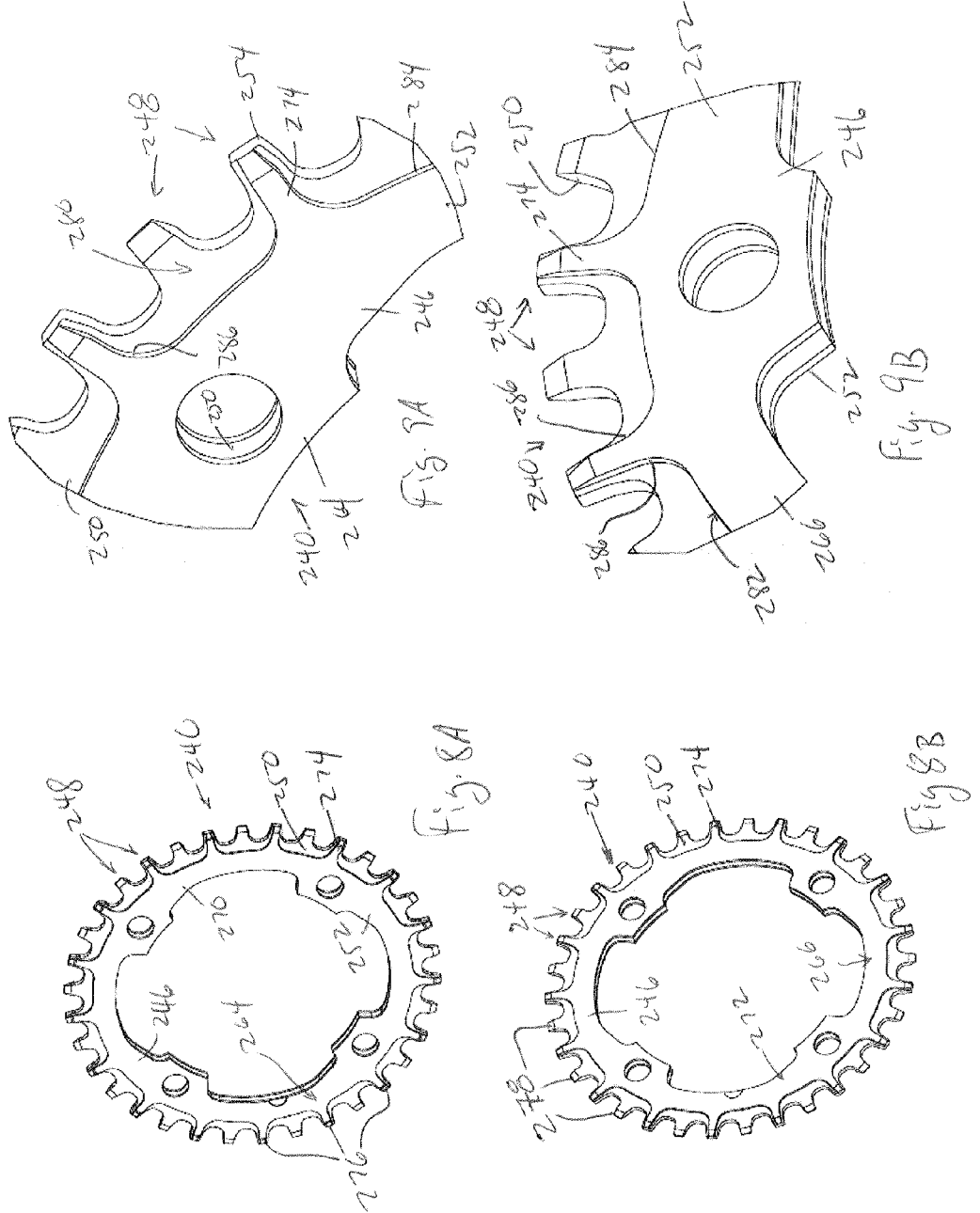

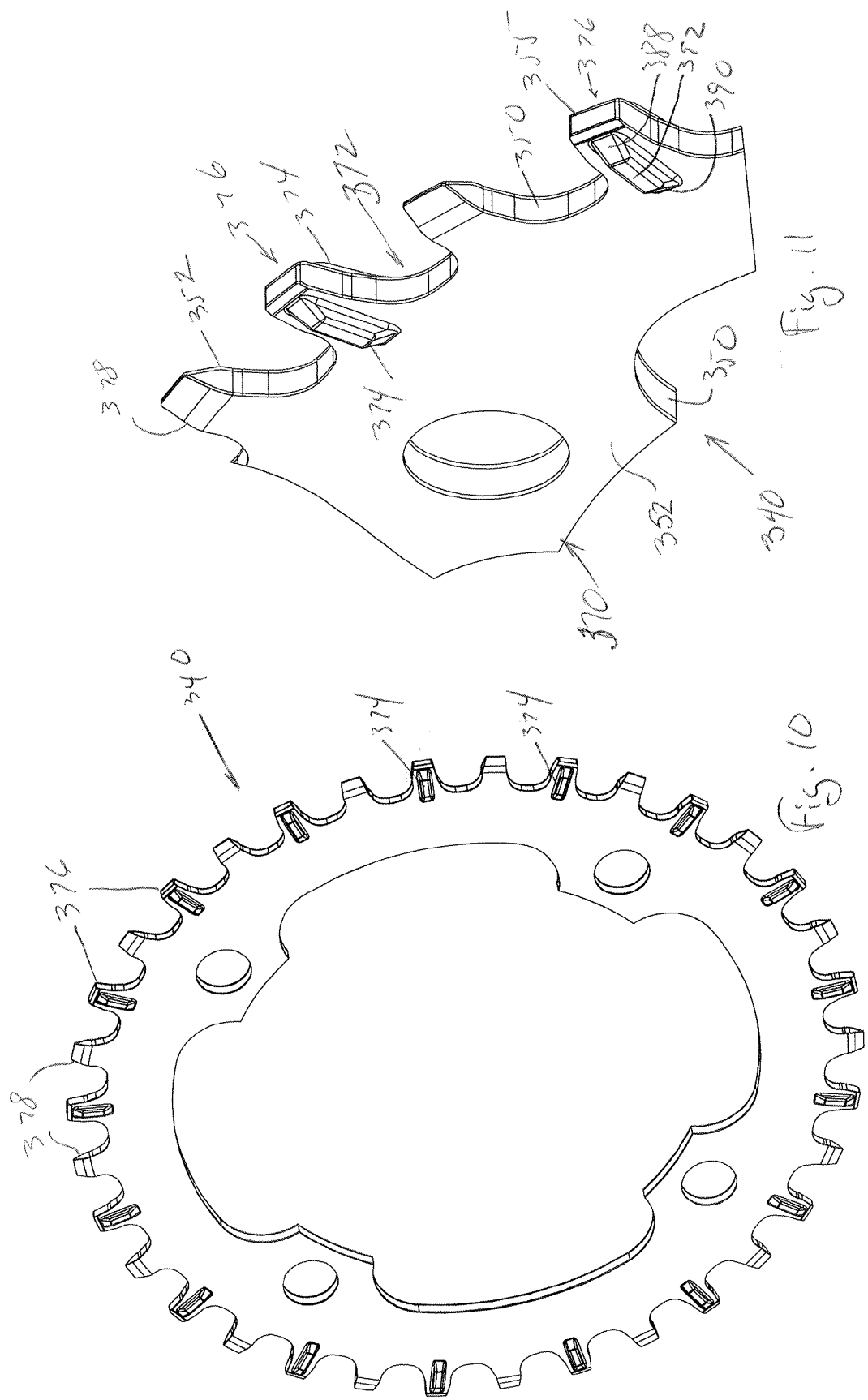

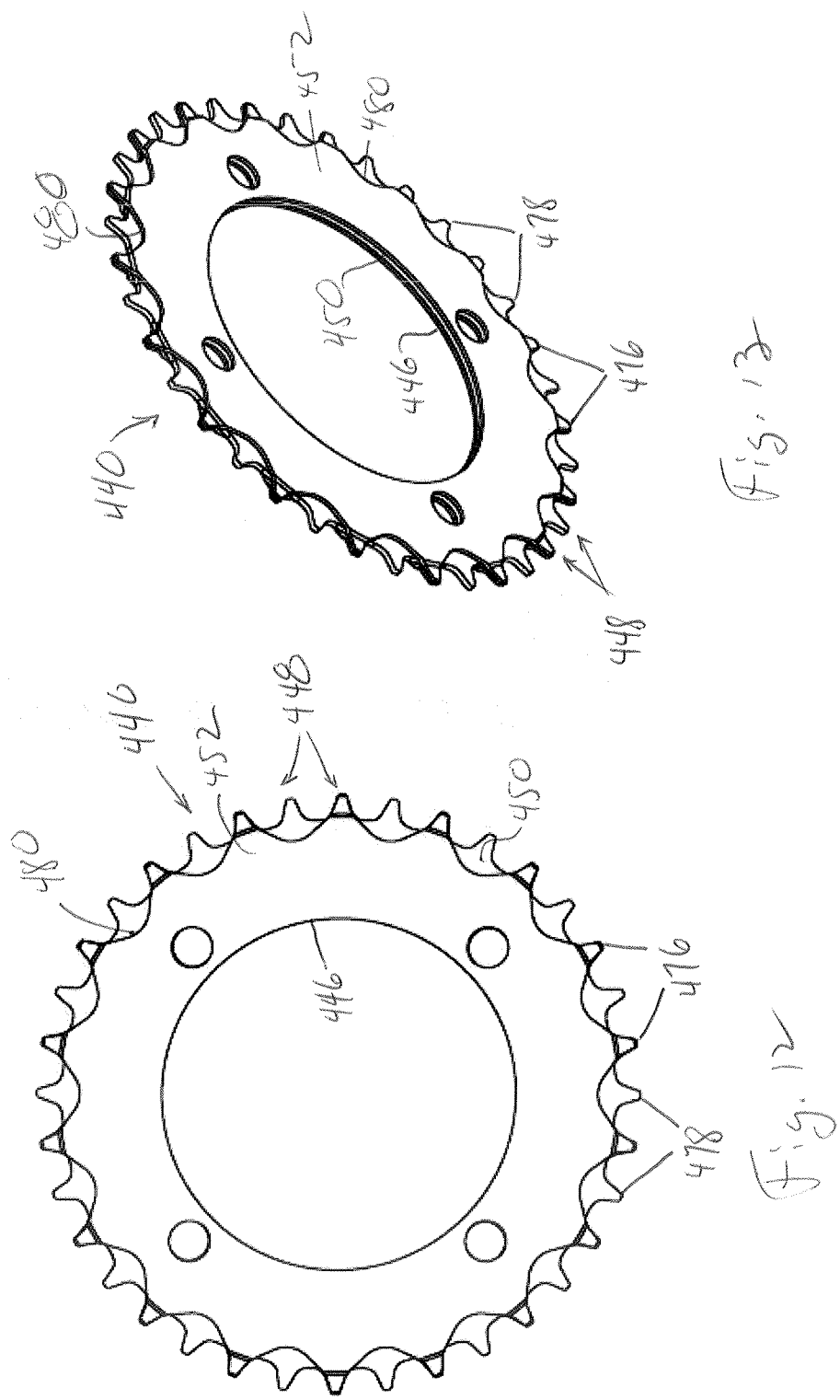

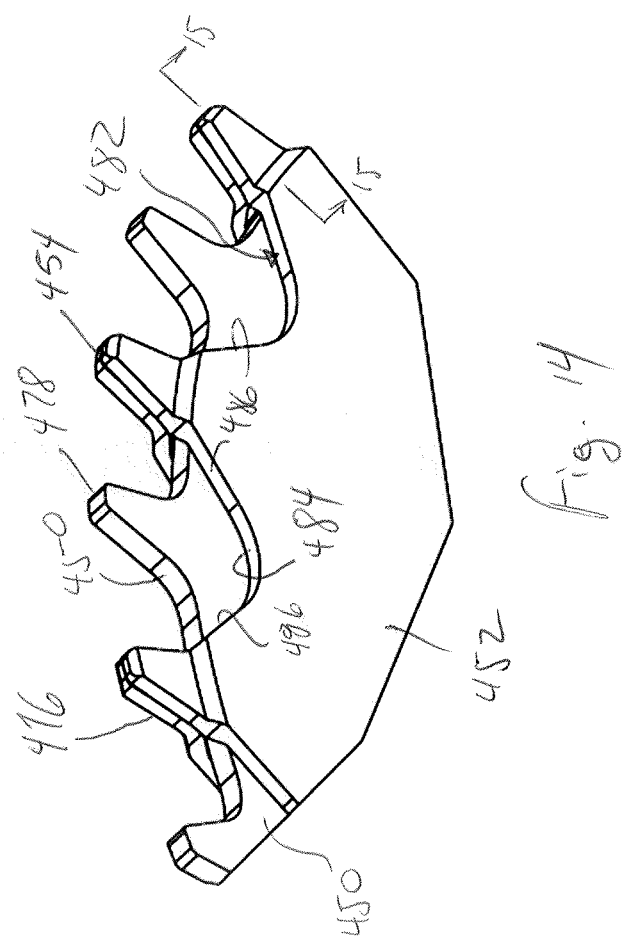

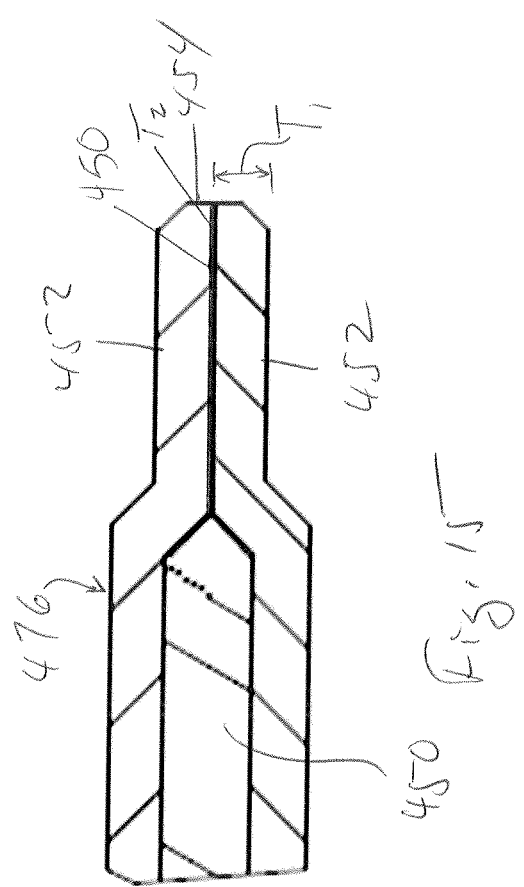

CLAD CHAINRING

BACKGROUND OF THE INVENTION

This invention relates to chainrings for bicycles.

Chainrings of standard bicycle drivetrains are most often made of steel or aluminum. Standard chainrings have a plurality of teeth disposed about the periphery thereof, all of which fit within the space defined by the link plates of an inner link of a standard bicycle roller chain. While some bicycle chainrings have used other materials, such as plastic or relatively exotic materials, these rings have not enjoyed commercial success due to inadequate performance properties or cost. Standard bicycle chainrings are also known that are plated and/or anodized in an attempt to improve wear performance and/or enhance the visual appearance of the chainrings. However, the material added to the chainrings is very thin—on the order of about 1-20 microns. Despite these beneficial modifications, plated or anodized chainrings do not typically provide a significant improvement in wear performance and may become deficient in appearance in a short period of time.

SUMMARY OF THE INVENTION

The invention provides, in one aspect, a bicycle chainring constructed by laminates or layers of material. In one general example, a bicycle chainring apparatus comprises a generally annular or circular chainring formed of a first or inner material and second or outer material. The outer material is disposed on the sides of the inner material. The chainring inner material may be clad with one or more layers of outer material. The second ring material is formed of a material having greater wear resistance and/or durability than the first ring material.

The construction of the chainring according to the invention may allow the use of thinner, more cost-effective materials. The inner and outer materials could be easily stamped in a cost effective manner, avoiding or reducing machining of thicker material and other manufacturing methods that involve multiple stamping, forming and trimming operations that add cost. Such laminated or clad construction allows the creation of simple ring tooth features such as recesses and teeth of various widths and/or configurations in a cost-effective manner.

The materials are assembled and can be joined together in any of several alternative ways, such as bonding, welding, brazing, riveting, or with mechanical fasteners, and possibly the same fasteners used to assemble the ring to a bicycle crank arm in a well-known fashion. It also allows hybrid construction using various materials to achieve different wear, weight, and cost needs that cannot be offered with traditional chainring designs. Alternatively, similar materials could be used with different finishes of various costs to balance wear, cost, and cosmetic requirements.

Other aspects of the invention provide a bicycle chainring, comprising a generally annular body formed of at least an inner material, the inner material including a first side and a second side opposite the first side and a plurality of teeth disposed about a periphery of the body, at least some of the plurality of teeth formed of both the inner material and an outer material, the outer material disposed on one or both sides of the tooth inner material, the outer material having a greater wear resistance relative to the inner material.

Further aspects of the invention provide a bicycle chainring wherein the inner material may include an aluminum alloy and the outer material includes an iron alloy. The plurality of teeth may include a first group of teeth and a second group of teeth, each of the teeth of the first group of teeth wider than each of the teeth of the second group of teeth. Each of the first group of teeth may be arranged between an adjacent pair of the second group of teeth. Each of the first group of teeth may be arranged between each of the second group of teeth in an alternating pattern. The plurality of teeth may be an even number of teeth. The first group of teeth and the second group of teeth may be equal in number. Each of the first group of teeth may include one or more protrusions. The protrusions may be formed of the outer material. The inner material of the first group of teeth may be thicker than the inner material of the second group of teeth. The outer material may be about 0.1 millimeters to about 2 millimeters in thickness. Preferably, the outer material may be about 0.5 millimeters to about 2 millimeters in thickness. The radially outermost portion of the outer material may include one or more bevel. Each of the plurality of teeth may include a tooth first side and a tooth second side, the outer material forming at least some of the tooth first and second sides. The first group of teeth may be formed of both the inner material and the outer material and the second group of teeth may be formed of only the inner material. The body may include the outer material disposed on one or both of the first and second sides of the inner material. Each of the plurality of teeth may be formed of both the inner material and the outer material. The body may include the outer material disposed on one or both of the first and second sides of the inner material. The outer material may extend radially short of a tip of each of the plurality of teeth. The outer material may extend radially to a tip of each of the plurality of teeth. The outer material may form the tip of each of the plurality of teeth. The outer material may be a substantially constant thickness.

A further aspect of the invention provides a bicycle chainring including a generally annular body formed of inner material and at least some outer material, the inner material including a first side and a second side opposite the first side, wherein the outer material is disposed on the first side and the second side of the inner material and a plurality of teeth disposed about a periphery of the body, at least some of the plurality of teeth formed of only the outer material, the outer material having a greater wear resistance relative to the inner material and a thickness greater than 0.1 millimeter. All of the plurality of teeth may be formed of only the outer material. The outer material that is disposed on the first side and the outer material that is disposed on the second side of the inner material and form the plurality of teeth may be equal in thickness.

These and other features and advantages of the present invention will be more fully understood from the following description of one or more embodiments of the invention, taken together with the accompanying drawings.

BRIEF DESCRIPTION OF THE DRAWINGS

In the drawings:

FIGS. 2A and 2B are partial cross sections of prior art chainrings;

FIG. 2C is a partial cross section of a chainring according to a variation of the invention;

FIG. 2D-F are partial cross sections of chainrings according to variations of the invention;

FIGS. 3A and 3B are first and second perspective views of a chainring according to a variation of the invention;

FIG. 4A is a close-up view of the chainring of FIG. 3A;

FIG. 4B is a close-up view of the chainring of FIG. 3B;

FIGS. 8A and 8B are first and second side views of a chainring according to a variation of the invention;

FIG. 9A is a close-up view of the chainring of FIG. 8A;

FIG. 9B is a close-up view of the chainring of FIG. 8B;

FIG. 10 is a perspective view of a chainring according to a variation of the invention;

FIG. 11 is a close-up view of the chainring of FIG. 10;

FIG. 12 is a side view of a chainring according to a variation of the invention;

FIG. 13 is a perspective view of the chainring of FIG. 12;

FIG. 14 is a partial close-up view of the chainring of FIG. 13; and

FIG. 15 is a partial cross sectional view of the construction of a tooth through line 15-15 of the chainring of FIG. 14.

DETAILED DESCRIPTION OF THE PREFERRED EMBODIMENTS

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used as references and not as limitations. Moreover, the terms refer to bicycle mechanisms conventionally mounted to a bicycle and with the bicycle oriented and used in a standard fashion unless otherwise indicated.

Figure 1:
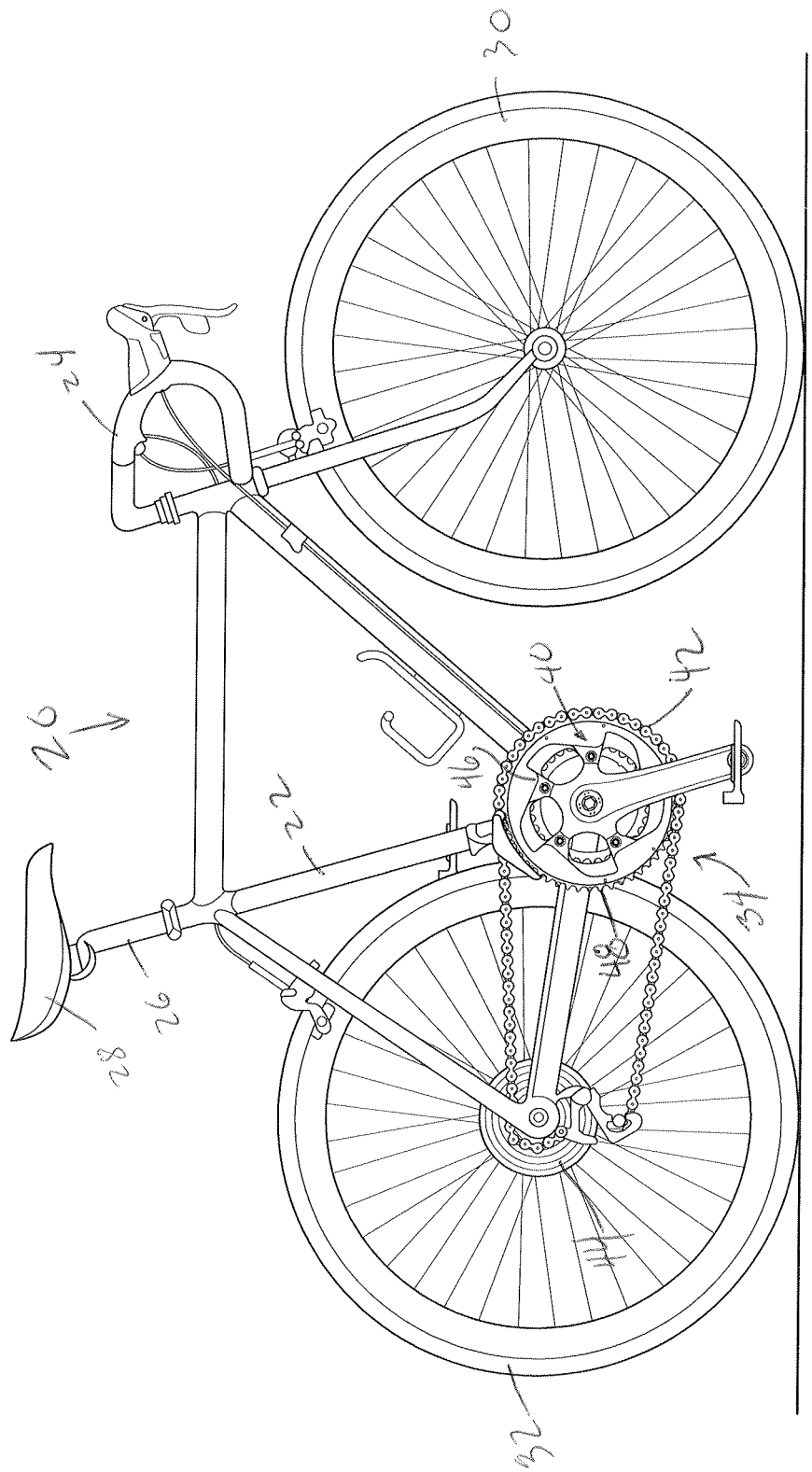
FIG. 1 is a conventional bicycle with a drivetrain including a chainring according to the invention.
Figure 6A:
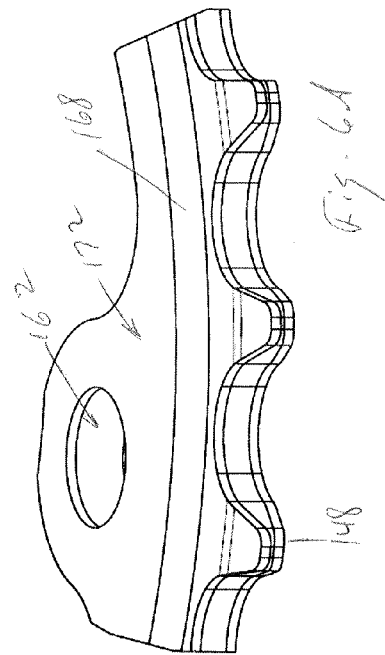
FIG. 6A is a close-up view of the chainring of FIG. 5A.
Figure 6B:
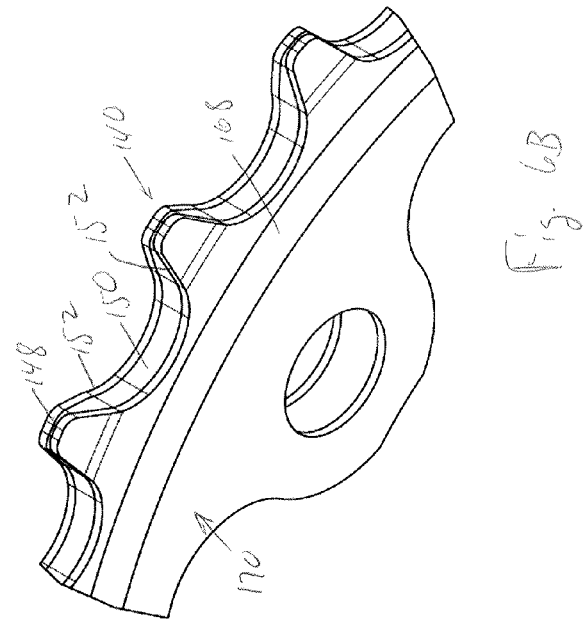
FIG. 6B is a close-up view of the chainring of FIG. 5B.
Figure 5A:
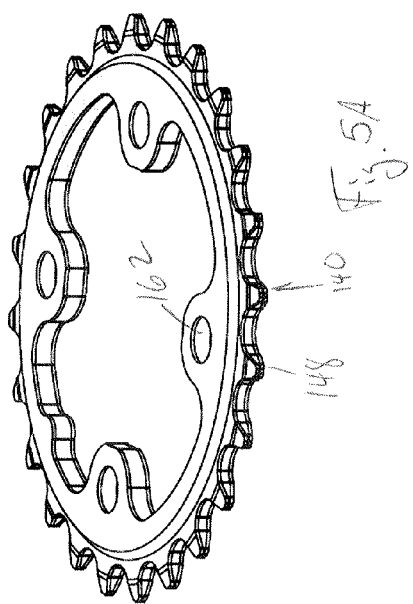
FIGS. 5A and 5B are first and second perspective views of a chainring according to a variation of the invention.
Figure 5B:
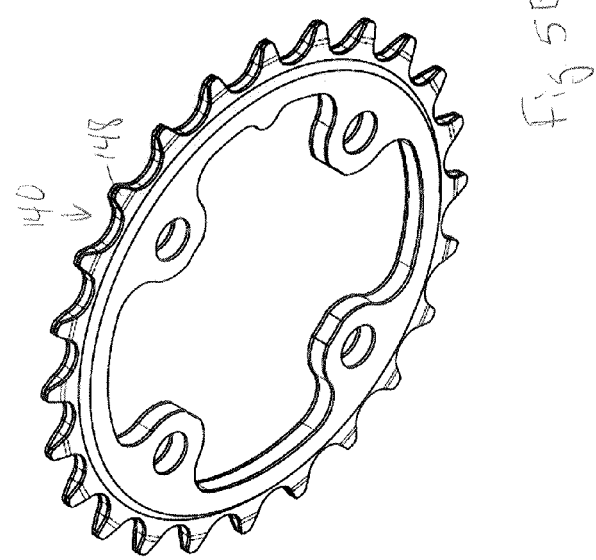
Figure 7:
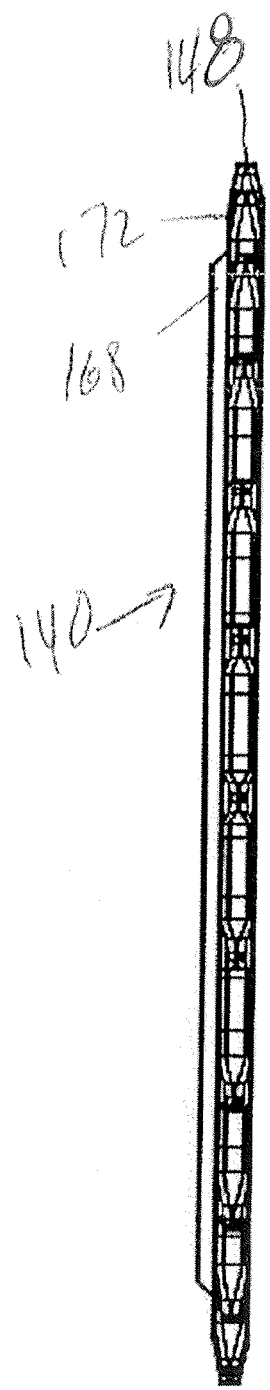
FIG. 7 is a top view of the chainring of FIGS. 4A, 4B, 5A and 5B.

FIG. 1 is a standard bicycle 20 of standard construction. A frame 22 supports a handlebar 24 at a front end thereof and a seat post 26 and seat 28 at an upper part thereof. The frame 22 also rotatably carries two wheels: a front wheel 30 at a front of the bicycle 20 and a rear wheel 32 at a rear thereof. A drive train 34 drivingly connects pedals 36 to the rear wheel 32. The drive train 34 may include one or more chainring 40, which engages a roller chain 42, which is engaged on a drive sprocket 44 of the rear wheel. Also, referring to FIGS. 2A and 2B, the chainring 40 includes a body 46 and a plurality of chain-engaging teeth 48 disposed about the periphery thereof. Standard chainrings feature a body 46 and teeth 48 constructed from a single piece of material, e.g., an aluminum alloy or a steel alloy. Since the structure of a standard bicycle is well known, further discussion will be omitted.

FIG. 2B shows the construction of a prior art chainring 40 having a prior art plating or anodizing. The chainring 40 includes a chainring body 46 with teeth 48 disposed about the periphery thereof. The chainring 40 is constructed with a base material 50 and plating or anodizing 52. The tooth 48 may be generally triangular or chisel shaped in cross section and may have a tip 54 portion that includes a flat area 55 at the outermost extent of the tooth or essentially come to a chisel point or edge. In the example illustrated in FIG. 2B, the layer of plating or anodizing, 52 extends along all of the chainring base material 50, along the entire sides of each tooth 48, and covers the tip at a point 56. The plating or anodized material 52 is typically less than 0.1 millimeters in thickness. It is an accepted deficiency of anodization, for example, that greater thickness creates a greater tendency for the anodized material to chip or flake off of the substrate, which is contrary to an objective of the invention.

FIG. 2C shows the construction of a chainring 140 according to one variation of the invention. The chainring 140 includes a chainring body 146 and teeth 148 disposed about the periphery thereof, as in the example shown in FIG. 2B, but constructed of two or more materials or laminates. In particular, the teeth 148 of the illustrated chainring may be of a size and shape to be received in an inner link space defined in a roller chain (FIG. 1) used in a bicycle drive train. It should be noted that the construction of FIGS. 2A and 2B is also of a size and shape that may be received in an inner link space of a roller chain.

Returning to FIG. 2C, a first or inner material 150 is clad by outer material 152. Outer material 152 meets at the tip 154 to contact at a shared face 160, and terminate at a flat tip 155. The outer material 152 may be about from 0.1 millimeters to about 2 millimeters in thickness. In this example, the thickness of the inner material 150 may be less than that of the inner material shown in FIG. 2B.

FIG. 2D shows the construction of a chainring 140 according to a variation of the invention. The chainring 140 includes a chainring body 146 and teeth 148 disposed about the periphery thereof as in the example shown in FIG. 2C and is constructed of two or more materials or laminates. In particular, the teeth 148 of the illustrated chainring may be of a size and shape to be received in an outer link space defined in a roller chain (FIG. 1) used in a bicycle drive train, but not an inner link space.

In one chainring 140 according to the invention, teeth formed as in FIG. 2D can be alternated with teeth, or some other pattern, formed as in FIG. 2C to construct a chainring with "thick and thin" teeth or in other words with teeth according to a first group (thick) and a second group (thin) arranged to engage a roller chain. Such tooth shapes and sized can be formed on the chainring 140 by known stamping processes which press the teeth into a final form as desired. Such a construction of a chainring and the processes by which they are formed will be explained in more detail below.

A first or inner material 150 is flanked or covered by outer material 152. In the example illustrated in FIG. 2D, the outer material 152 extends to, but does not meet at, the flat tip 154 of the teeth 148. The flat tip 155 therefore includes material of both the exposed inner material 150 and outer material 152. The outer material 152 may be about from 0.1 millimeters to about 2 millimeters in thickness.

FIG. 2E shows the construction of a chainring 140 according to a variation of the invention. The chainring 140 includes a chainring body 146 and teeth 148 disposed about the periphery thereof. In particular, the teeth 148 of the illustrated chainring may be of a size and shape to be received in an outer link space defined in a roller chain (FIG. 1) used in a bicycle drive train, but not an inner link space.

The chainring 140 is constructed of two or more materials or laminates. A first or inner material 150 is clad by outer material 152. The outer material 152 extends to the sides of, but not along the entire radial extent or height of the tooth 148. The tooth 148 and flat tip 154 of the tooth is composed mostly or entirely of the inner material 150. The outer material 152 may be about from 0.1 millimeters to about 2 millimeters in thickness.

FIG. 2F shows the construction of a chainring 140 according to another variation of the invention. The chainring 140 includes a chainring body 146 and teeth 148 disposed about the periphery thereof and constructed of two or more materials or laminates. In particular, the teeth 148 of the illustrated chainring may be of a size and shape to be received in an outer link space defined in a roller chain (FIG. 1) used in a bicycle drive train, but not an inner link space.

A first or inner material 150 forms the center material. Outer material 152 flanks or covers the inner material. The outer material 152 extends along a portion of the body and may be considered a band of outer material or a plurality of individual protrusions as will be shown in more detail hereinbelow. The teeth 148 and flat tip 154 of the tooth is composed mostly of the inner material 150. The outer material 152 may be about from 0.1 millimeters to about 2 millimeters in thickness.

In one embodiment, a chainring may be constructed with teeth of the type shown in FIG. 2C in combination with teeth of the type shown in any of FIGS. 2D-F. It will be understood that the teeth will be arranged to engagingly cooperate with the spaces defined by the inner and outer links of the chain.

FIGS. 3A, B and 4A, B and 7 show an entire chainring 140 according to the invention which is constructed according to FIG. 2D. The chainring 140 includes a chainring body 146 and a plurality of teeth 148 disposed about the periphery thereof. The chainring 140 is constructed of a first or inner material 150 clad by outer material 152 positioned on opposing sides of the inner material. The outer material 152 may extend to the tip 154 of the tooth 148. The outer material 152 may meet at the tip 154 or may be spaced apart by the inner material 150. The tip 154 of each of the teeth 148 has a flat section 155.

While the body 146 may take any number of forms, the chainring 140 has well-known features that permit it to be attached to a crank arm 35 of a drivetrain 34 (see FIG. 1) directly or via a spider or any suitable arrangement. The features may be in the form of a plurality of holes 162, for example four holes, arranged in the chainring body 146 that are sized and spaced to receive well known crank arm chainring bolts (not shown) and mate with the crank arm 35 or a separate, well-known spider (not shown), for example.

The inner material 150 may be made of aluminum or aluminum alloys, plastic, or composite materials, for example. The outer material 152 may be made of iron alloys like steel and are made of a harder, more wear-resistant material than the inner material 150.

The first face 164 of the chainring 140 shown in FIGS. 3A and 4A may be generally planar. The first face 164 could be oriented in an inboard or outboard direction when mounted on the bicycle 20, especially if the teeth are formed symmetrically. Otherwise, the chainring 140 will have a preferred orientation. The second face 166 of the chainring 140 shown in FIGS. 3B and 4B may be stepped with a thicker section 168 radially inward. The teeth 148 may include inboard and outboard sides 170, 172, which may be referred to as first and second sides, that angle inwardly to provide a thinner tooth at the tip 154 than at a base 158 thereof.

The chainring 140 of FIGS. 5A, 5B, 6A, 6B is similar to that in the above example, with the additional feature of thicker sections 168 formed on both the first and second sides 170, 172 and radially below the teeth 148. In this example, the teeth 148 can receive a roller chain 42 without concern for matching the tooth size and shape to fit within corresponding inner and outer links spaces. While this chainring 140 can be a single, solitary chainring for a bicycle, it could also be used with one or more additional chainrings attached to a common crank arm and/or multiple sprockets 44 at the rear wheel of the bicycle to provide a range of gear ratios. Accordingly, if the chainring 140 is to be used in a drivetrain 34 where the chain 42 is intended to be shifted on and off the chainring, the chainring may be provided with well-known features to assist shifting operations, such as pins, ramps, clearances and so on (not shown).

Turning to FIGS. 8A, 8B and 9A, 9B, a chainring 240 is shown that uses the construction and methods described herein to form a chainring with various chain-engaging features. The chainring 240 includes a generally annular body 246 and a plurality of teeth 248 disposed thereabout. The chainring 240 includes an inner material 250 that forms the core of the body 246 and the center portion of the teeth 248. Outer material 252 forms the outside of the body 246 and protrusions 274 on the first and second sides 270, 272 of some of the teeth 248. The protrusions 274 may be arranged on alternating ones of the teeth 248 or in a pattern that enables the chainring 240 to be used with a roller chain 42 by matching the arrangement of teeth with protrusions and the arrangement of teeth without protrusions to engage with the spaces defined by inner and outer links in some fashion.

The teeth 248 comprising protrusions 274 may be considered a first set or group of teeth 276. The teeth 248 lacking the protrusions may be considered a second group of teeth 278. Each tooth of the first group of teeth 276 is wider (in a cross-sectional/axial direction) than those of the second group of teeth 278. Each tooth of the first group of teeth 276 may have a shape and size configured to be received within an outer link of a roller chain but not an inner link. Each tooth of the second group of teeth 278 is received within any of the inner and outer links.

In one embodiment, the first and second groups of teeth 276, 278 are arranged alternatingly about the periphery of the chainring 240 to correspondingly engage inner and outer links of a standard roller chain 42. However, the pattern of teeth with protrusions 274 would not have to be arranged in a strictly alternating pattern to operate with a roller chain 42, as long as the teeth with protrusions are positioned in some fashion to align and engage with outer links of the chain.

The chainring 240 may include one outer material 252 on one of the inner face 264 and outer face 266, or may include an outer material 252 on both the inner face and outer face of the chainring. The chainring 240 may include recesses 280 defined, at least in part, by the outer material 252. The recesses 280 are each sized and shaped to receive an entire chain link plate and are defined by the planar side of the inner material 250 that is not covered by the outer material 252 and the axially-extending edge 282 defined by the radially outer perimeter of the outer material. In other words, each of the recesses 280 include a bottom section 284 that is radially inward from and generally centered on a corresponding one of the second group of teeth 278 and a pair of ramp sections 286 that extend away from the bottom section and along the protrusions 274 to the tip 254 of each tooth 276. The shape of the protrusions 274 may define a "plus" or "cross-shaped" tooth section at the base of each of the first group of teeth 276 and along a majority of the radial height of each of the first group of teeth.

FIGS. 10 and 11 show another embodiment of the invention. The chainring 340 is constructed to function with a roller chain in a similar fashion as that of the chainring 240 of FIG. 8A. The illustrated chainring 340 includes an inner material 350 and outer material 352 disposed on opposite sides of the inner material. The chainring 340 also includes a plurality of discreet protrusions 374 formed of the outer material 352. The protrusions 374 are disposed on the first and second sides 370, 372 on alternate teeth to form a first group of teeth 376. Arranged alternatingly between the first group of teeth 376 is a second group of teeth 378, which lack protrusions 374. In this embodiment, each of the second group of teeth 378 is rectangular at the base thereof and terminates with a chisel shape and each of the first group of teeth 376 has a "plus" or "cross-shaped" tooth section at the base thereof and along a majority of the radial height of each of the first group of teeth. Furthermore, each of the first group of teeth 376 has a flat tip 355, which may be rectangular. Also, the protrusions 374 may include a radially outer chamfer 388, and optionally, a radially inner chamber 390. In between the radially outer chamfer 388 and radially inner chamber 390 may be a planar outer face 392, which is substantially parallel to a plane of the chainring 340.

Another construction method could include a stamping operation of the chainring either before or after assembly that offsets the outer laminates in an area where the inner material is reduced, caused to be reduced or is absent, thus joining the outer materials together to form a tooth as shown in FIGS. 12-15. A chainring 440 is shown that uses the construction and methods described herein to form a chainring with various chain-engaging features. The chainring 440 includes a generally annular body 446 and a plurality of teeth 448 disposed thereabout. The chainring 440 includes an inner material 450 that forms the core of the body 446 and the center portion of at least some of the teeth 448. Outer material 452 forms the outside of the body 446

At least some of the teeth 448 may be considered a first set or group of teeth 476. The teeth 448 lacking the outer material may be considered a second group of teeth 478. Each tooth of the first group of teeth 476 has a shape and size configured to be received within an outer link of a roller chain but not an inner link. Each tooth of the second group of teeth 478 may be received within any of the inner and outer links. In the illustrated embodiment, the first and second groups of teeth 476, 478 are arranged alternatingly about the periphery of the chainring 440 to correspondingly engage inner and outer links of a standard roller chain 42. However, the pattern of teeth of the first group 476 would not have to be arranged in a strictly alternating pattern to operate with a roller chain 42, as long as each of the teeth of the first group are positioned to align and engage with one of the outer links of the chain in some fashion.

The chainring 440 may include outer material 452 on both the inner face and outer faces of the chainring. The chainring 440 may include recesses 480 defined, at least in part, by the outer material 452. The recesses 480 are each sized and shaped to receive an entire chain link plate and are defined by the planar side of the inner material 450 that is not covered by the outer material 452 and the axially-extending edge 482 defined by the radially outer perimeter of the outer material. In other words, each of the recesses 480 include a bottom section 484 that is radially inward from and generally centered on a corresponding one of the second group of teeth 478 and a pair of ramp sections 486 that extend to the tip 454 of each tooth 476 of the first group.

Turning to FIG. 15, in one embodiment, the thickness $T_1$ of the outer material 452 is greater than the thickness $T_2$ of the inner material 450 in the teeth of the first group of teeth 476. The thicknesses of the inner and outer material 450, 452 can be created during a process involving stamping, for example.

The inner and outer materials 150, 152 (and other embodiments) of the invention can be joined and/or fixed together by various known methods. An epoxy, such as a high temperature cure epoxy adhesive film, can be applied to the mating surfaces of the inner and outer materials 150, 152. These surfaces should be prepared in a known fashion to assure best bonding capability. The materials 150, 152 can be stacked. Locating features such as pins (not shown) can be used to align the inner and outer materials 150, 152. The assembled materials 150, 152 can be clamped together and placed in an oven to cure the epoxy. The bond gap can be maintained by the adhesive.

Alternatively, a liquid epoxy could be used. This could be applied by hand or by automated methods. Microscopic glass balloons or other spacing means can be utilized to maintain the bond gap between materials 150, 152. The epoxy could be a high temperature cure or two-part room temperature cure.

Challenges might arise in cleaning up the epoxy that seeps from the perimeter. It is possible to finish the chainring 140 after the application of adhesive by anodization if all materials 150, 152 are aluminum or employing electro-deposition (ED) coating if it is a combination of steel and aluminum.

Bonding may be considered to provide the most freedom in using dissimilar materials in the process of joining the materials 150, 152, i.e., steel paired with aluminum. Pre-finishing of surfaces before bonding is also an option.

Another method of joining the inner and outer materials 150, 152 is brazing. Brazing paste is applied to the mating surfaces. The materials 150, 152 can be assembled with locating pins for alignment, clamped in a fixture and passed through a furnace to perform the brazing operation.

Another method of joining the inner and outer materials 150, 152 is welding. The materials 150, 152 could be spot welded if they are of weldable material. Welds can be applied at the teeth 48 to prevent separation of the materials 150, 152 at the interface of the chainring and chain. Welding may be preferred with a chainring of all-steel construction.

Another method of joining the inner and outer materials 150, 152 is riveting. The materials 150, 152 can be riveted together. The benefit of riveting is that dissimilar materials could be used for the layers of the chainring and the rivets locate each of the materials 150, 152 relative to each other. The rivets used to fix the materials 150, 152 together could be the shifting rivets themselves in the case of a shifting ring. Pre-finishing is a further option. Challenges might arise with corrosion in between the materials 150, 152 after usage in the field, and therefore pre-finishing of the materials may be advisable before assembly to address this issue.

Another method of joining the inner and outer materials 150, 152 is with fasteners. The materials 150, 152 can be assembled using various threaded fasteners, either with a tapped hole in one of the materials that a screw can be assembled into or by a nut and bolt configuration. Alternatively, the fasteners used to assemble the chainring 140 to the crankset could also serve the purpose of joining the laminates together.

All of the methods disclosed herein to assemble or form the inventive chainrings are considered within the ability of one with ordinary skill in the art.

Depending on the objectives, the chainring can be constructed with two or more laminates, layers or materials. Three chainring layers is one preferred solution. The inner (middle) material 150 forms a lightweight core, which could be formed of aluminum, but could also be a polymer of reasonable strength, a composite such as carbon fiber or fiberglass and epoxy. The inner layer 150 could be anywhere from about 0.1 mm-2 mm thick. The inner material 150 could be the laminate or layer that interfaces directly with the crank arm during assembly—however it is possible that the outer material 152 could also serve this purpose or the laminates are selectively paired together or are all clamped by the fasteners fixing the ring to the crank arm. The outer material 152 could also be aluminum of the same or different alloy, a different and more expensive finish, or they could be steel, for example. The invention contemplates a version where the outer material 152 is of a more durable material.

The inner material 150 and outer material 152 could also be anywhere from about 0.1 mm-2 mm thick or more. One alternative is to build up a tooth thickness of the desired size but with a more durable outer "shell". The benefit includes wear resistance on the teeth by utilizing a wear-resistant material layer. Also, any recesses and other features that would otherwise need to be cut or formed according to a conventional chainring can be created by forming or cutting them out of the outer material 152 during a very cost effective stamping operation. Chainrings with alternating thick/thin designs (see FIGS. 8-15) can benefit from the inventive construction as the cost of machining or forming the thin teeth are reduced or avoided as the outer materials can simply have these teeth eliminated or removed from their form, leaving only the width of the tooth formed by the inner material to make up the thin tooth (of the second group). In the alternative, the stamping process can be used to form the size and shape of the teeth, and in particular, the chainring can be stamped to produce the final size and shape of the first group and the second group of the plurality of teeth.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle chainring, comprising:
a generally annular body formed of at least an inner material, the inner material including a first side and a second side opposite the first side; and
a plurality of teeth disposed about a periphery of the body, at least some of the plurality of teeth formed of both the inner material and an outer material, the outer material disposed on one or both of the first and second sides, the outer material having a greater wear resistance relative to the inner material and a thickness greater than 0.1 millimeter, wherein the inner material of at least one tooth of the plurality of teeth has a different axial thickness than the inner material of other teeth of the plurality of teeth.

2. The bicycle chainring of claim 1, wherein the inner material includes an aluminum alloy and the outer material includes an iron alloy.

3. The bicycle chainring of claim 1, wherein the plurality of teeth include a first group of teeth and a second group of teeth, each of the teeth of the first group of teeth wider than each of the teeth of the second group of teeth.

4. The bicycle chainring of claim 3, wherein each of the first group of teeth is arranged between an adjacent pair of the second group of teeth.

5. The bicycle chainring of claim 3, wherein each of the first group of teeth is arranged between each of the second group of teeth in an alternating pattern.

6. The bicycle chainring of claim 3, wherein the plurality of teeth is an even number of teeth.

7. The bicycle chainring of claim 6, wherein the first group of teeth and the second group of teeth are equal in number.

8. The bicycle chainring of claim 3, wherein each of the first group of teeth include one or more protrusions.

9. The bicycle chainring of claim 8, wherein the protrusions are formed of the outer material.

10. The bicycle chainring of claim 3, wherein the inner material of the first group of teeth is thicker than the inner material of the second group of teeth.

11. The bicycle chainring of claim 10, wherein the outer material is about 0.1 millimeters to about 2 millimeters in thickness.

12. The bicycle chainring of claim 10, wherein the inner material includes an aluminum alloy and the outer material includes an iron alloy.

13. The bicycle chainring of claim 12, wherein the first group of teeth is formed of both the inner material and the outer material and the second group of teeth is formed of only the inner material.

14. The bicycle chainring of claim 12, wherein the outer material extends radially short of a tip of each of the plurality of teeth.

15. The bicycle chainring of claim 12, wherein the outer material extends radially to a tip of each of the plurality of teeth.

16. The bicycle chainring of claim 10, wherein the body includes the outer material disposed on one or both of the first and second sides of the inner material.

17. The bicycle chainring of claim 16, wherein the outer material forms the tip of the plurality of teeth.

18. The bicycle chainring of claim 16, wherein a radially outermost portion of the outer material includes one or more bevel.

19. The bicycle chainring of claim 16, wherein the outer material is about 0.1 millimeters to about 2.0 millimeters in thickness.

20. The bicycle chainring of claim 10, wherein each of the plurality of teeth includes a tooth first side and a tooth second side, the outer material forming at least some of the tooth first and second sides.

21. The bicycle chainring of claim 3, wherein the first group of teeth is formed of both the inner material and the outer material and the second group of teeth is formed of only the inner material.

22. The bicycle chainring of claim 21, wherein the outer material has a first thickness and the inner material of the teeth of the first group has a second thickness, wherein the first thickness is greater than the second thickness.

23. The bicycle chainring of claim 1, wherein the body includes the outer material disposed on one or both of the first and second sides of the inner material.

24. The bicycle chainring of claim 1, wherein each of the plurality of teeth is formed of both the inner material and the outer material.

25. The bicycle chainring of claim 24, wherein the plurality of teeth include a first group of teeth and a second group of teeth, each of the teeth of the first group of teeth wider than each of the teeth of the second group of teeth.

26. The bicycle chainring of claim 25, wherein each of the first group of teeth includes one or more protrusions.

27. The bicycle chainring of claim 26, wherein the one or more protrusions are formed of the outer material.

28. The bicycle chainring of claim 24, wherein the inner material includes an aluminum alloy and the outer material includes an iron alloy.

29. The bicycle chainring of claim 24, wherein the outer material is from about 0.1 millimeters to about 2 millimeters in thickness.

30. The bicycle chainring of claim 24, wherein the body includes the outer material disposed on one or both of the first and second sides of the inner material.

31. The bicycle chainring of claim 24, wherein each of the plurality of teeth includes a tooth first side and a tooth second side, the outer material forming at least some of the tooth first and second sides.

32. The bicycle chainring of claim 31, wherein the outer material extends radially short of a tip of each of the plurality of teeth.

33. The bicycle chainring of claim 31, wherein the outer material extends radially to a tip of each of the plurality of teeth.

34. The bicycle chainring of claim 33, wherein the outer material forms the tip of each of the plurality of teeth.

35. The bicycle chainring of claim 31, wherein a radially outermost portion of the outer material includes one or more bevel.

36. The bicycle chainring of claim 31, wherein the outer material is a constant thickness.

\* \* \* \* \*